United States Patent
Wang et al.

(10) Patent No.: US 11,187,797 B2
(45) Date of Patent: Nov. 30, 2021

(54) METHOD FOR RANGE AMBIGUITY SUPPRESSION BASED ON MULTI-DEGREE-OF-FREEDOM FREQUENCY MODULATION SIGNAL

(71) Applicant: Institute of Electronics, Chinese Academy of Sciences, Beijing (CN)

(72) Inventors: Yu Wang, Beijing (CN); Guodong Jin, Beijing (CN); Yunkai Deng, Beijing (CN); Wei Wang, Beijing (CN); Yongwei Zhang, Beijing (CN); Kaiyu Liu, Beijing (CN)

( * ) Notice: Subject to any disclaimer, the term of this patent is extended or adjusted under 35 U.S.C. 154(b) by 355 days.

(21) Appl. No.: 16/284,732

(22) Filed: Feb. 25, 2019

(65) Prior Publication Data
US 2019/0346556 A1 Nov. 14, 2019

(30) Foreign Application Priority Data

Oct. 31, 2018 (CN) .......................... 201811290570.3

(51) Int. Cl.
*G01S 13/90* (2006.01)
*G01S 7/282* (2006.01)
(Continued)

(52) U.S. Cl.
CPC .......... *G01S 13/9011* (2013.01); *G01S 7/282* (2013.01); *G01S 7/292* (2013.01); *G01S 7/41* (2013.01)

(58) Field of Classification Search
CPC ...... G01S 13/9011; G01S 7/282; G01S 7/292; G01S 7/41
See application file for complete search history.

(56) References Cited

U.S. PATENT DOCUMENTS

| 10,845,474 B1 * | 11/2020 | Riley | G01S 7/527 |
| 2018/0224535 A1 * | 8/2018 | Sankar | G01S 13/38 |
| 2018/0259639 A1 * | 9/2018 | Rubel | G01S 13/9052 |

FOREIGN PATENT DOCUMENTS

| CN | 101082666 A | 12/2007 |
| CN | 101540042 A | 9/2009 |

(Continued)

OTHER PUBLICATIONS

Simultaneous range ambiguity mitigation and sidelobe reduction using orthogonal non-linear frequency modulated ONLFM signals for satellite SAR Imaging; Zhi-huo Xu; Robert Wang, Kai Ye, Wei Wang, Shi Quan & Ming Wei; pp. 829-838, Jul. 3, 2018; Download citation https://doi.org/10.1080/2150704X.2018 (Year: 2018).*

(Continued)

*Primary Examiner* — Donald H B Braswell
(74) *Attorney, Agent, or Firm* — Pattao, LLC; Junjie Feng (57) ABSTRACT

Provided are a method and an apparatus for range ambiguity suppression based on orthogonal nonlinear frequency modulation (NLFM) waveforms. The method includes that: according to transmitted orthogonal NLFM signals, a waveform sequence of the transmitted signals corresponding to an obtained echo signal is determined; a set of range matched filters is constructed according to the waveform sequence and the orthogonal NLFM signals; range compression is performed on the echo signal by using the set of range matched filters to obtain range-compressed data; and synthetic aperture radar (SAR) imaging is performed according to the range-compressed data, to obtain an imaging result, and the imaging result is outputted. A non-transitory computer-readable storage medium is also provided.

11 Claims, 10 Drawing Sheets

(51) Int. Cl.
  *G01S 7/292* (2006.01)
  *G01S 7/41* (2006.01)

(56) References Cited

FOREIGN PATENT DOCUMENTS

| CN | 102073992 A | 5/2011 |
|---|---|---|
| CN | 102955150 A | 3/2013 |
| CN | 103308913 A | 9/2013 |
| CN | 103869313 A | 6/2014 |
| CN | 103368976 B | 3/2015 |
| CN | 106597386 A | 4/2017 |
| CN | 108196236 A | 6/2018 |

OTHER PUBLICATIONS

Guo Lei et al. "Range Ambiguity Suppression for Multi-channel SAR System Using Azimuth Phase Coding Technique", Journal of Electronics&Information Technology, issued on Mar. 31, 2015, vol. 37 No. 3, pp. 601-605.
A. R. Conn, N. Gould, and P. L. Toint, "A globally convergent Lagrangian barrier algorithm for optimization with general inequality constraints and simple bounds," Math. Comput. Amer. Math. Soc., vol. 66, No. 217, pp. 261-288, 1997.
J. Mittermayer and J. M. Martinez, "Analysis of range ambiguity suppression in SAR by up and down chirp modulation for point and distributed targets," in Proc. IEEE Int. Geosci. Remote Sens. Symp. (IGARSS), vol. 6, Jul. 2003, pp. 4077-4079.
C. Y. Chang and J. C. Curlander, "Application of the multiple PRF technique to resolve Doppler centroid estimation ambiguity for spaceborne SAR," IEEE Trans. Geosci. Remote Sens., vol. 30, No. 5, pp. 941-949, Sep. 1992.
J. Dall and A. Kusk, "Azimuth phase coding for range ambiguity suppression in SAR," in Proc. IEEE Int. Geosci. Remote Sens. Symp. (IGARSS), vol. 3, Sep. 2004, pp. 1734-1737.
S. Zhu, G. Liao, Y. Qu, X. Liu, and Z. Zhou, "A new slant-range velocity ambiguity resolving approach of fast moving targets for SAR system," IEEE Trans. Geosci. Remote Sens., vol. 48, No. 1, pp. 432-451, Jan. 2010.
Y.-K. Deng, F.-J. Zhao, and Y. Wang, "Brief analysis on the development and application of spaceborne SAR," J. Radars, vol. 1, No. 1, pp. 1-10, 2012.
Jin, G., Deng, Y., Wang, R., Wang, W., Zhang, Y., Long, Y., & Liang, D. (2019). Mitigating Range Ambiguities With Advanced Nonlinear Frequency Modulation Waveform. IEEE Geoscience and Remote Sensing Letters. mailed on Feb. 14, 2019.
W. Wang et al., "First demonstration of airborne SAR with nonlinear FM chirp waveforms," IEEE Geosci. Remote Sens. Lett., vol. 13, No. 2, pp. 247-251, Feb. 2016.
W.-Q. Wang and J. Cai, "Ground moving target indication by MIMO SAR with multi-antenna in azimuth," in Proc. IEEE Int. Geosci. Remote Sens. Symp., Jul. 2011, pp. 1662-1665.
R. K. Raney, A. Freeman, and R. L. Jordan, "Improved range ambiguity performance in quad-pol SAR," IEEE Trans. Geosci. Remote Sens., vol. 50, No. 2, pp. 349-356, Feb. 2012.
V. Riché, S. Méric, J.-Y. Baudais, and É. Pottier, "Investigations on OFDM signal for range ambiguity suppression in SAR configuration," IEEE Trans. Geosci. Remote Sens., vol. 52, No. 7, pp. 4194-4197, Jul. 2014.
L. Jackson, S. Kay, and N. Vankayalapati, "Iterative method for nonlinear FM synthesis of radar signals," IEEE Trans. Aerosp. Electron. Syst., vol. 46, No. 2, pp. 910-917, Apr. 2010.
W. Dierking, "Mapping of different sea ice regimes using images from Sentinel-1 and ALOS synthetic aperture radar," IEEE Trans. Geosci. Remote Sens., vol. 48, No. 3, pp. 1045-1058, Mar. 2010.
G. Krieger, "MIMO-SAR: Opportunities and pitfalls," IEEE Trans. Geosci. Remote Sens., vol. 52, No. 5, pp. 2628-2645, May 2014.
W.-Q. Wang, "Mitigating range ambiguities in high-PRF SAR with OFDM waveform diversity," IEEE Geosci. Remote Sens. Lett., vol. 10, No. 1, pp. 101-105, Jan. 2013.
J. Jakabosky, P. Anglin, M. R. Cook, S. D. Blunt, and J. Stiles, "Nonlinear FM waveform design using Marginal Fisher's Information within the CPM framework," in Proc. IEEE RadarCon (RADAR), May 2011, pp. 513-518.
J. M. Kurdzo, B. L. Cheong, R. D. Palmer, and G. Zhang, "Optimized NLFM pulse compression waveforms for high-sensitivity radar observations," in Proc. Int. Radar Conf., Oct. 2014, pp. 1-6.
S. D. Blunt, J. Jakabosky, M. Cook, J. Stiles, S. Seguin, and E. L. Mokole, "Polyphase-coded FM (PCFM) radar waveforms, part II: optimization," IEEE Trans. Aerosp. Electron. Syst., vol. 50, No. 3, pp. 2230-2241, Jul. 2014.
F. Caltagirone, G. De Luca, F. Covello, G. Marano, G. Angino, and M. Piemontese, "Status, results, potentiality and evolution of COSMOSkyMed, the Italian Earth Observation constellation for risk management and security," in Proc. IEEE Int. Geosci. Remote Sens. Symp., Jul. 2010, pp. 4393-4396.
J. Saeedi and K. Faez, "Synthetic aperture radar imaging using nonlinear frequency modulation signal," IEEE Trans. Aerosp. Electron. Syst., vol. 52, No. 1, pp. 99-110, Feb. 2016.
E. Fowle, "The design of FM pulse compression signals," IEEE Trans. Inf. Theory, vol. IT-10, No. 1, pp. 61-67, Jan. 1964.
I. Vizitiu, L. Anton, F. Popescu, and G. Iubu, "The synthesis of some NLFM laws using the stationary phase principle," in Proc. 10th Int. Symp. Electron. Telecommun., Nov. 2012, pp. 377-380.
R. Werninghaus and S. Buckreuss, "The TerraSAR-X mission and system design," IEEE Trans. Geosci. Remote Sens., vol. 48, No. 2, pp. 606-614, Feb. 2010.
J. Jakabosky, S. D. Blunt, and T. Higgins, "Ultra-low sidelobe waveform design via spectral shaping and LINC transmit architecture," in Proc. IEEE Radar Conf. (RadarCon), May 2015, pp. 1021-1026.

* cited by examiner

METHOD FOR RANGE AMBIGUITY SUPPRESSION BASED ON MULTI-DEGREE-OF-FREEDOM FREQUENCY MODULATION SIGNAL

CROSS-REFERENCE TO RELATED APPLICATION

The present application claims benefit of Chinese Application No. 201811290570.3, filed on Oct. 31, 2018, the contents of which are hereby incorporated by reference in its entirety.

TECHNICAL FIELD

The disclosure relates to a field of synthetic aperture radar (SAR) imaging technology, and relates, but is not limited, to a method, an apparatus and a device for range ambiguity suppression based on orthogonal nonlinear frequency modulation (NLFM) waveforms.

BACKGROUND

SAR can be applied to all-time, all-weather and global earth observation widely. However, it is limited by two basic problems.

First, restraints of resolution and swath width: as azimuth resolution is higher, pulse repetition frequency (PRF) is higher, and the selectable swath width is narrower. Therefore, the azimuth resolution and the range swath width cannot be increased simultaneously.

Second, a restraint relationship between azimuth ambiguity and range ambiguity: as the PRF is higher, that is, the azimuth over-sampling rate is larger, energy of the azimuth ambiguity is smaller, and a range ambiguity area will be closer to a signal area, and thus be received by higher sidelobes, thereby the energy of the range ambiguity is larger. It can be seen that a trade-off relationship exists between the azimuth ambiguity and the range ambiguity by taking the PRF as a medium.

In the general satellite-borne SAR application, the azimuth bandwidth is large, and the PRF is high. In order to ensure the swath width, the over-sampling rate is low, and generally 1.2. Therefore, both the range ambiguity and the azimuth ambiguity exist, and the influence is serious. Therefore, it is the core technical problem of SAR to suppress ambiguity.

SUMMARY

Embodiments of the disclosure are intended to provide a method, an apparatus and a device for range ambiguity suppression based on orthogonal NLFM waveforms. Furthermore, the orthogonal NLFM waveform can improve the orthogonality of the signals as much as possible with acceptable widths of the sidelobes and the main lobe, namely, the cross-correlation energy can be minimized, thereby range ambiguity can be suppressed, thereby improving the imaging quality.

The embodiments of the disclosure provide a method for range ambiguity suppression based on orthogonal NLFM waveforms. The method includes the following operations.

According to transmitted orthogonal NLFM signals, a waveform sequence of the transmitted signals corresponding to an obtained echo signal is determined; a set of range matched filters is constructed according to the waveform sequence and the orthogonal NLFM signals; range compression is performed on the echo signal by using the set of range matched filters to obtain range-compressed data; and SAR imaging is performed according to the range-compressed data.

The embodiments of the disclosure also provide an apparatus for range ambiguity suppression based on orthogonal NLFM waveforms, which includes: a first determination module, a construction module, a range compression module and an imaging module.

The first determination module is configured to determine, according to transmitted orthogonal NLFM signals, a waveform sequence of the transmitted signals corresponding to an obtained echo signal.

The construction module is configured to construct a set of range matched filters according to the waveform sequence and the orthogonal NLFM signals.

The range compression module is configured to perform range compression on the echo signal by using the set of range matched filters to obtain range-compressed data.

The imaging module is configured to perform SAR imaging according to the range-compressed data, to obtain an imaging result, and output the imaging result.

The embodiments of the disclosure also provide a device for range ambiguity suppression based on orthogonal NLFM waveforms, which includes: a processor and a memory configured to store a computer program capable of running on the processor.

When running the computer program, the processor executes the operations of any of the foregoing methods for range ambiguity suppression based on orthogonal NLFM waveforms.

The embodiments of the disclosure further provide a computer-readable storage medium having stored thereon computer-executable instructions. The computer-executable instructions may be configured to, when executed by a processor, execute the operations of the above method.

The embodiments of the disclosure provide a method, an apparatus and a device for range ambiguity suppression based on orthogonal NLFM waveforms. Firstly, according to transmitted orthogonal NLFM signals, a waveform sequence of the transmitted signals corresponding to an obtained echo signal is determined. Then, a set of range matched filters is constructed according to the waveform sequence and the orthogonal NLFM signals. Then, range compression is performed on the echo signal by using the set of range matched filters to obtain range-compressed data. Finally, SAR imaging is performed according to the range-compressed data, to obtain an imaging result, and the imaging result is outputted. Furthermore, the orthogonal NLFM waveform can improve the orthogonality as much as possible with acceptable widths of the sidelobes and the main lobe, namely, the cross-correlation energy can be minimized, thereby range ambiguity can be suppressed, thereby improving the imaging quality.

DETAILED DESCRIPTION

In order to better understand the embodiments of the disclosure, common methods for ambiguity suppression in the related art are described here firstly.

A radar pitching antenna pattern is not an ideal beam. An actual width of coverage of antenna pitching beam is larger than a swath width, therefore, echo energy is also returned outside a swath area irradiated by the main lobe for range. Moreover, the echo energy is further returned in an area irradiated by the sidelobes. These external echoes are mixed with useful echoes in the swath, signal processing is performed on the echoes, which reduces the quality of a radar image and affects the interpretation and identification of a true target. Generally, the ambiguity energy caused by the sidelobes of antenna is called range ambiguity. The range ambiguity is a great technical challenge for the existing SAR systems.

It is a potential solution of ambiguity suppression to alternately transmit different waveforms. It is based on the basic principle that the ambiguity echo of the sidelobe irradiation is delayed by a certain PRT relative to the useful echo of the main lobe. Considering the first ambiguity area, the ambiguity echo is delayed by one PRT relative to the useful echo. Then, when different waveforms are transmitted, the ambiguity echo and the useful echo have different waveform sequences. Further, after the range matched filtering, the useful echo is in a matched state, and the ambiguity echo is in a mismatched state. In this case, when the cross-correlation energy between the waveforms is low, the ambiguity energy can be suppressed. In the related solution, such as up and down chirp signals, the cross-correlation energy is equal to the auto-correlation energy. Therefore, after range matched filtering, the ambiguity energy is not changed, namely, the ambiguity energy cannot be suppressed.

Based on this fact, in the present disclosure, based on orthogonal NLFM signals, the energy distribution of the same frequency band can be changed. Furthermore, the orthogonal NLFM waveform can improve the orthogonality as much as possible with acceptable widths of the sidelobes and the main lobe, namely, the cross-correlation energy can be minimized, thereby range ambiguity can be suppressed, thereby improving the imaging quality.

The existing methods for ambiguity suppression mainly include the following.

In a first method for ambiguity suppression, azimuth phase coding (APC) is performed. Specifically, the range ambiguity is modulated to azimuth ambiguity by using a specific coding mode for range, and is filtered out through azimuth filtering. However, the method needs PRF twice more than a bandwidth, thus greatly limiting breadth.

In a second method for ambiguity suppression, up-down chirp signals are alternately transmitted. The range ambiguity can be suppressed to a certain extent by alternately transmitting the up-down chirp signals. However, the up-down chirp signals can only disperse ambiguity energy to the whole time domain but cannot reduce cross-correlation energy (ambiguity energy). For SAR, since a distributed target is detected and all the ambiguity energies may be accumulated, the ambiguity energy cannot be reduced.

Besides the up-down chirp signals, other methods of alternately transmitting signals have various problems, mainly including the following: 1) the signals are short-time orthogonal, but energy may be accumulated at a far end, and the ambiguity energy is not reduced; 2) orthogonal signals are not in the same frequency band, therefore, the coherence is reduced; and 3) a discrete signal is not applicable to a distributed scene.

In order to make the purposes, technical solutions and advantages of the embodiments of the disclosure clearer, a specific technical solution of the disclosure will be further described in detail below with reference to the drawings in the embodiments of the disclosure. The following embodiments are intended to describe the disclosure, but not intended to limit the scope of the disclosure.

First Embodiment

Figure 1:
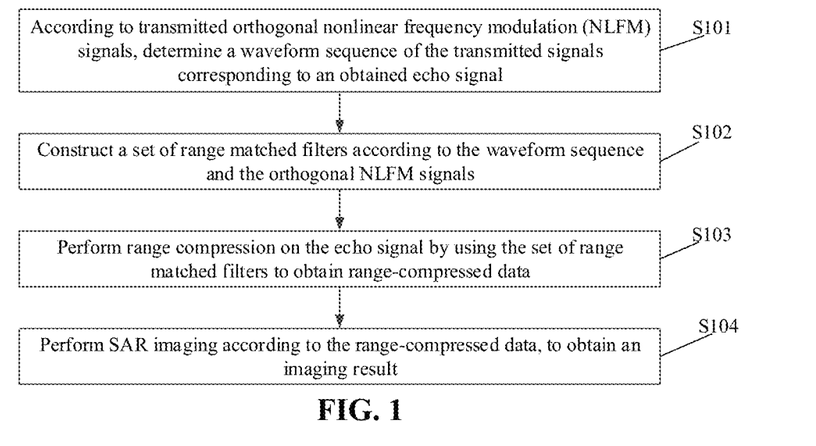
FIG. 1 is a schematic flowchart of implementation of a method for range ambiguity suppression based on orthogonal NLFM waveforms according to an embodiment of the disclosure.

The embodiment of the disclosure provides a method for range ambiguity suppression based on orthogonal NLFM waveforms. FIG. 1 is a schematic flowchart of implementation of a method for range ambiguity suppression based on orthogonal NLFM waveforms according to the embodiment of the disclosure. As illustrated in FIG. 1, the method includes the following operations.

At block S101, according to transmitted orthogonal NLFM signals, a waveform sequence of the transmitted signals corresponding to an obtained echo signal is determined.

Here, block S101 may be implemented by a device for range ambiguity suppression based on orthogonal NLFM waveforms. The device for range ambiguity suppression based on the orthogonal NLFM waveforms may also be called an SAR imaging device. Further, the SAR imaging device may be a smart terminal having a computing power such as a desk computer.

In other embodiments, before performing block S101, a transmitter may periodically transmit the orthogonal NLFM signals, each period having a preset duration. A different orthogonal NLFM signal is transmitted in each pulse repetition interval (PRI) in the preset duration. For ease of understanding the embodiment of the disclosure, the NLFM signal is described here.

Compared with a linear frequency modulation (LFM) signal, the frequency of the NLFM signal is not linearly varied in the duration, that is, a derivative of the frequency of the NLFM signal with respect to time is not constant. The NLFM signal may be regarded as improvement of the LFM signal. The NLFM signal has a lower peak sidelobe ratio, so that windowing is not required compared with the LFM signal. Further, the orthogonal NLFM signals are lower in cross-correlation energy and better in orthogonality compared with the LFM signal.

In the embodiment of the disclosure, before or after the transmitter transmits orthogonal NLFM signals, identification information is transmitted in the PRI for transmitting the orthogonal NLFM signals, and the orthogonal NLFM signals can be determined according to the identification information. For example, when the transmitter periodically transmits the orthogonal NLFM signals, each period having three PRIs, two-bit binary numbers may be used as identification information of three orthogonal NLFM signals in each period. For example, the three orthogonal NLFM signals are $s_1(t)$, $s_2(t)$, and $s_3(t)$. Identification information corresponding to $s_1(t)$ may be 00, identification information corresponding to $s_2(t)$ may be 01, and identification information corresponding to $s_3(t)$ may be 10. Of course, the identification information corresponding to the orthogonal NLFM signals may also be represented by other forms. The manner of setting the identification information proposed by those skilled in the art using the technical idea of the disclosure according to specific demands thereof fall within the scope of protection of the disclosure, and will not be exhaustive herein.

In the embodiment of the disclosure, the transmitter may send corresponding identification information when transmitting the orthogonal NLFM signals. Therefore, a receiver may receive not only an echo signal, but also the identification information corresponding to the echo signal. Then a waveform sequence of the transmitted signals corresponding to the echo signal may be determined according to the identification information corresponding to the echo signal. For example, when the received identification information corresponding to the echo signal are 01, 10, 00, a sequence of the transmitted signals corresponding to the received echo signal may be determined to be $s_2(t)$, $s_3(t)$, $s_1(t)$ according to the identification information.

At block S102, a set of range matched filters is constructed according to the waveform sequence and the orthogonal NLFM signals.

Here, block S102 may be implemented by an SAR imaging device.

When block S102 is implemented, a spectral function of the orthogonal NLFM signals corresponding to the waveform sequence may be determined according to the waveform sequence and the orthogonal NLFM signals, then a conjugate function of the spectral function is determined to be a transfer function of the range matched filter.

Referring to the example in block S101, assuming that the waveform sequence of the transmitted signals corresponding to the received echo signal is $s_2(t)$, $s_3(t)$, $s_1(t)$, spectral functions corresponding to the waveform sequence are firstly determined to be $S_2(f)$, $S_3(f)$, and $S_1(f)$. Then conjugate functions of the spectral functions are determined to be $S^*_2(f)$, $S^*_3(f)$, and $S^*_1(f)$, that is to say, transfer functions of the set of range matched filters corresponding to the echo signal are $S^*_2(f)$, $S^*_3(f)$, and $S^*_1(f)$.

At block S103, range compression is performed on the echo signal by using the set of range matched filters to obtain range-compressed data.

Here, block S103 may be implemented by an SAR imaging device. After the transfer function of the set of range matched filters is determined, range compression is performed on the echo signal by using the set of range matched filters to obtain range-compressed data.

At block S104, SAR imaging is performed according to the range-compressed data, to obtain an imaging result.

Here, block S104 may be implemented by an SAR imaging device. In practical application, SAR imaging may be performed on the range-compressed data by using an imaging algorithm, to obtain an imaging result.

In other embodiments, after performing block S104, the method further includes that the imaging result is outputted.

In the method for range ambiguity suppression based on orthogonal NLFM waveforms in the embodiment of the disclosure, firstly, a waveform sequence corresponding to the obtained echo signal is determined according to the transmitted orthogonal NLFM signals. Then, a set of range matched filters is constructed according to the waveform sequence and the orthogonal NLFM signals. Then, range compression is performed on the echo signal by using the set of range matched filters to obtain range-compressed data. Finally, SAR imaging is performed according to the range-compressed data, to obtain an imaging result. Furthermore, the orthogonal NLFM waveform can improve the orthogonality as much as possible with acceptable widths of the sidelobes and the main lobe, namely, the cross-correlation energy can be minimized, thereby range ambiguity can be suppressed, thereby improving the imaging quality.

Second Embodiment

Figure 2:
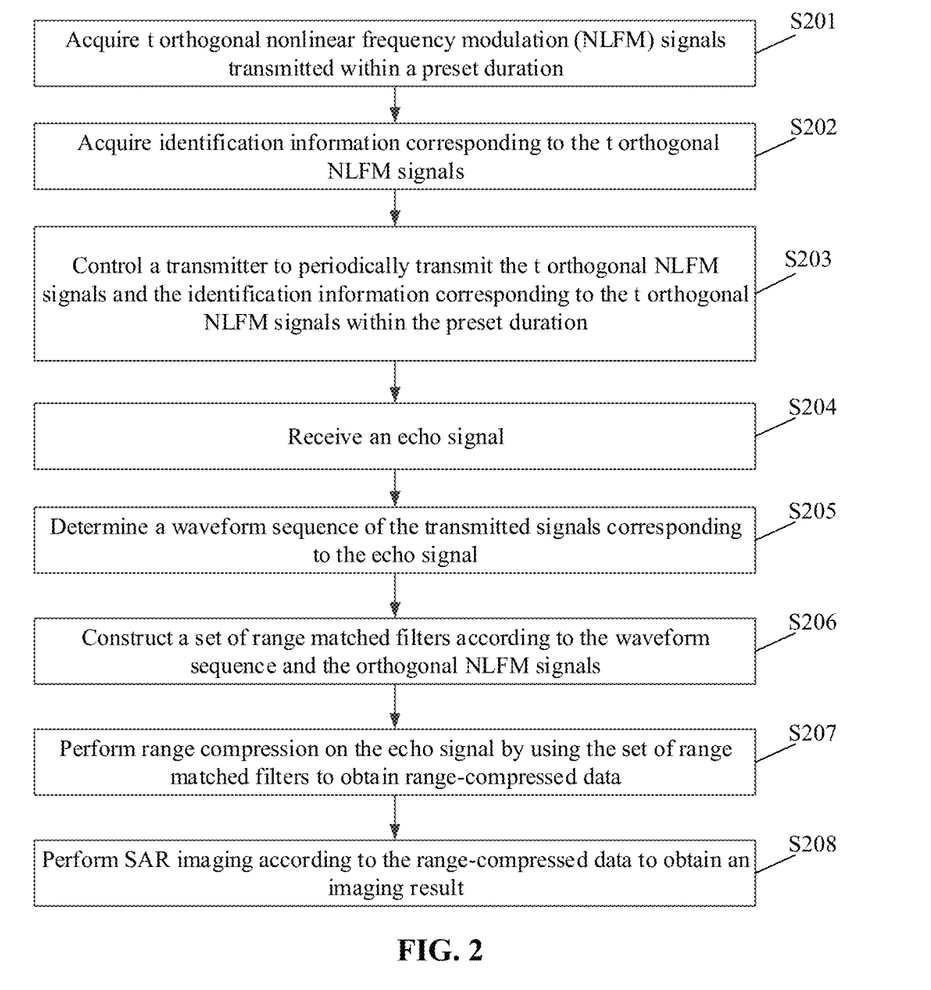
FIG. 2 is a schematic flowchart of implementation of a method for range ambiguity suppression based on orthogonal NLFM waveforms according to an embodiment of the disclosure.

On the basis of the foregoing embodiment, the embodiment of the disclosure provides a method for range ambiguity suppression based on orthogonal NLFM waveforms, which is applied to a device for range ambiguity suppression based on orthogonal NLFM waveforms, that is, an SAR imaging device. FIG. 2 is a schematic flowchart of implementation of a method for range ambiguity suppression based on orthogonal NLFM waveforms according to the embodiment of the disclosure. As illustrated in FIG. 2, the method includes the following operations.

At block S201, an SAR imaging device acquires t orthogonal NLFM signals transmitted within a preset duration.

Here, the preset duration is t times as much as PRI, where t is a natural number greater than 1. The orthogonal NLFM signals may be set manually in advance.

In the present embodiment, acquisition of the t orthogonal NLFM signals may be acquisition of expressions of orthogonal NLFM signals or acquisition of discrete values of orthogonal NLFM signals.

At block S202, the SAR imaging device acquires identification information corresponding to the t orthogonal NLFM signals.

Here, the identification information is used for identifying different orthogonal NLFM signals, the t orthogonal NLFM signals corresponding to t identification information. The identification information may be a binary number, a decimal number, a hexadecimal number or the like. The identification information of each orthogonal NLFM signal may be set in advance by staff, or may be randomly allocated.

For example, in the present embodiment, t is 4, four orthogonal NLFM signals are $s_1(t)$, $s_2(t)$, $s_3(t)$, and $s_4(t)$. It may be manually set in advance that, the identification information corresponding to $s_1(t)$ is 00, the identification information of $s_2(t)$ corresponding to 01, the identification information of $s_3(t)$ corresponding to 10, and the identification information of $s_4(t)$ corresponding to 11. Of course, it may also be set that one of the identification information of $s_1(t)$, $s_2(t)$, $s_3(t)$, and $s_4(t)$ is one of 00, 01, 10 and 11. The SAR imaging device randomly allocates the identification information. It is assumed that the identification information allocated by the SAR imaging device are the following: the identification information corresponding to $s_3(t)$ is 00, the identification information corresponding to $s_1(t)$ is 01, the identification information corresponding to $s_4(t)$ is 10, and the identification information corresponding to $s_2(t)$ is 11.

At block S203, the SAR imaging device controls, according to the t orthogonal NLFM signals and the corresponding identification information, the transmitter to periodically transmit the t orthogonal NLFM signals and the identification information corresponding to the t orthogonal NLFM signals within the preset duration.

Here, after obtaining the t orthogonal NLFM signals and the corresponding identification information, the SAR imaging device controls the transmitter to periodically transmit the t orthogonal NLFM signals and the corresponding identification information in sequence in each pulse repetition period.

In practical implementation, block S203 may be implemented by the following operations.

At block S2031, the transmitter is controlled, according to the t orthogonal NLFM signals and the corresponding identification information, to periodically transmit an ith orthogonal NLFM signal within the preset duration.

Here, i=1, 2, . . . , t.

At block S2032, the transmitter is controlled to transmit identification information corresponding to the ith orthogonal NLFM signal, such that the transmission of the identification information is performed after the transmission of the ith orthogonal NLFM signal and spaced from the transmission of the ith orthogonal NLFM signal by a preset number of protection bits.

Here, the identification information is transmitted after each orthogonal NLFM signal is transmitted and before an echo receiving window.

At block S204, the SAR imaging device receives an echo signal.

Here, the echo signal not only includes an echo signal generated by irradiating the transmitted orthogonal NLFM signals to a target, but also includes identification information corresponding to the orthogonal NLFM signals.

At block S205, the SAR imaging device determines a waveform sequence of the transmitted signals corresponding to the echo signal.

Here, block S205 may be implemented by the following operations.

At block S2051, after obtaining the echo signal, a sequence of identification information carried in the echo signal is determined.

At block S2052, a waveform sequence of the transmitted signals corresponding to the obtained echo signal is determined according to the sequence of the identification information and orthogonal NLFM signals corresponding to the identification information.

On the basis of the example in block S202, it is assumed that, the identification information corresponding to $s_1(t)$ is 00, the identification information corresponding to $s_2(t)$ is 01, the identification information corresponding to $s_3(t)$ is 10, the identification information corresponding to $s_4(t)$ is 11, and the sequence of the identification information carried in the received echo signal is 10, 11, 00, 01, 10, 11, . . . . A waveform sequence of the transmitted signals corresponding to the obtained echo information can be obtained as $s_3(t)$, $s_4(t)$, $s_1(t)$, $s_2(t)$ according to the sequence of the identification information and the orthogonal NLFM signals corresponding to the identification information.

At block S206, the SAR imaging device constructs a set of range matched filters according to the waveform sequence and the orthogonal NLFM signals.

Here, block S206 may be implemented by the following operations.

At block S2061, the orthogonal NLFM signals corresponding to the waveform sequence are determined according to the waveform sequence.

At block S2062, Fourier transform is performed on the orthogonal NLFM signals, to obtain a spectral function of the orthogonal NLFM signals.

At block S2063, a conjugate function of the spectral function is determined to be a transfer function of the range matched filter.

After the transfer function of the range matched filter is determined, it can be regarded that the range matched filter is determined.

At block S207, the SAR imaging device performs range compression on the echo signal by using the set of range matched filters to obtain range-compressed data.

At block S208, the SAR imaging device performs SAR imaging according to the range-compressed data, to obtain an imaging result.

It is to be noted that the explanation of the same steps or concepts in the present embodiment as other embodiments may refer to the descriptions in other embodiments.

In the method for range ambiguity suppression based on orthogonal NLFM waveforms in the embodiment of the disclosure, firstly, t orthogonal nonlinear frequency-modulated signals transmitted within a preset duration are obtained by a device for range ambiguity suppression based on orthogonal NLFM waveforms, and identification information corresponding to the t orthogonal NLFM signals are determined. Then, the transmitter is controlled, according to the t orthogonal NLFM signals and the corresponding identification information, to periodically transmit the t orthogonal NLFM signals and the identification information corresponding to the t orthogonal NLFM signals within the preset duration. The SAR imaging device determines a waveform sequence of the transmitted signals corresponding to an echo signal upon reception of the echo signal. Then, the SAR imaging device constructs a set of range matched filters according to the waveform sequence and the orthogonal NLFM signals, and then performs range compression on the echo signal by using the set of range matched filters to obtain range-compressed data. Finally, SAR imaging is performed according to the range-compressed data, to obtain an imaging result. Furthermore, the orthogonal NLFM waveform can improve the orthogonality as much as possible with acceptable widths of the sidelobes and the main lobe, namely, the cross-correlation energy can be minimized. Further, since ambiguity energy and useful signals differ by a certain PRI, and the waveform sequence differs by a certain PRI due to this characteristic, the useful signals are matched and ambiguity signals are mismatched (that is, the cross-correlation energy is reduced) by using the orthogonality of the signals, so that range ambiguity can be suppressed, thereby improving the SAR imaging quality.

Third Embodiment

Figure 3:
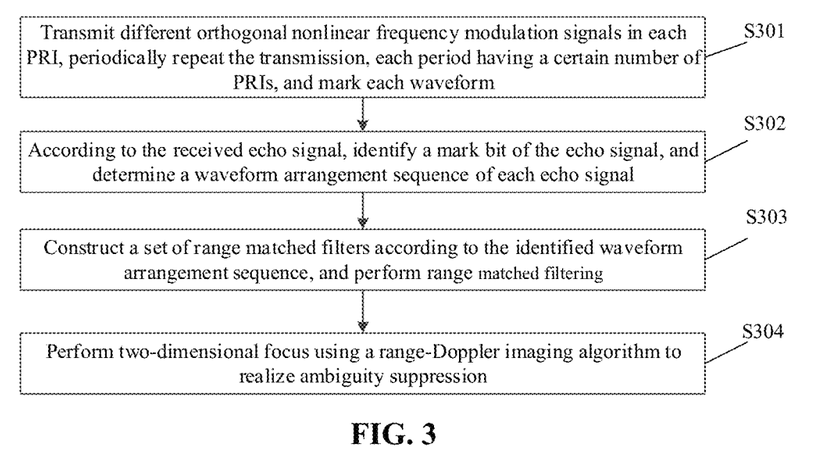
FIG. 3 is a schematic flowchart of implementation of a method for range ambiguity suppression based on orthogonal NLFM waveforms according to an embodiment of the disclosure.

On the basis of the foregoing embodiments, the embodiment of the disclosure further provides a method for range ambiguity suppression based on orthogonal NLFM waveforms. In SAR imaging, range ambiguity may be suppressed by using orthogonal NLFM signals. FIG. 3 is a schematic flowchart of implementation of SAR imaging according to the embodiment of the disclosure. As illustrated in FIG. 3, the method includes the following operations.

At block S301, when a transmitter transmits signals, different orthogonal NLFM signals are transmitted in different PRIs. The transmission is periodically repeated, each period having a certain number of PRIs, and each waveform is marked.

Figure 4:
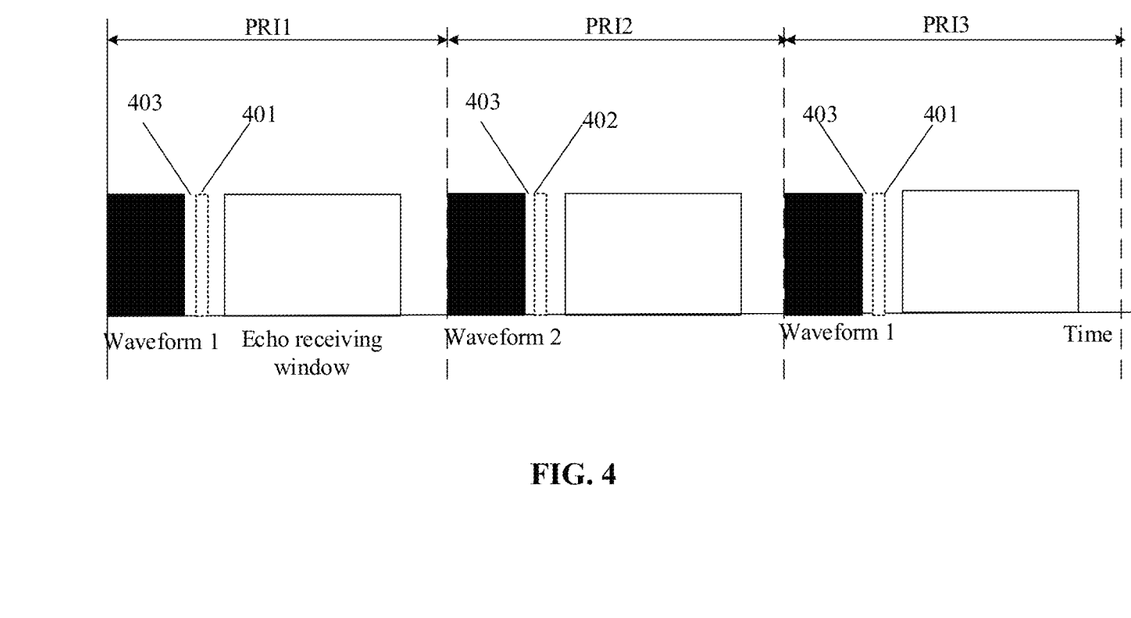
FIG. 4 is a schematic diagram of a timing sequence of transmitted waveforms of a transmitter according to an embodiment of the disclosure.

Here, as illustrated in FIG. 4, two signals are taken as an example. A signal $s_1(t)$ is transmitted in a first PRI, a signal $s_2(t)$ is transmitted in a second PRI, the signal $s_1(t)$ is transmitted in a third PRI, and the signal $s_2(t)$ is transmitted in a fourth PRI. Thus, the signals are periodically transmitted, each period having two PRIs, where $s_1(t)$ and $s_2(t)$ are orthogonal NLFM signals with the same frequency band and large time widths. In addition, it can also be seen from FIG. 4 that a mark bit for marking each signal is provided following each signal at an interval of a protection bit 403, namely a mark bit 401 of $s_1(t)$ and a mark bit 402 of $s_2(t)$, so as to identify different signal sequences.

At block S302, upon reception of an echo signal, a receiver identifies a mark bit of the echo signal, and determines a waveform arrangement sequence of the echo signal.

Here, since the received echo signal also has the mark bit, the waveform arrangement sequence of the echo signal may be determined according to the mark bit of the echo signal. In the present embodiment, assuming that the sequence of the received echo signal is determined to be $s_2(t)$, $s_1(t)$, $s_2(t)\ldots$, in this way, the echo signal is periodically received, each period having two PRIs.

At block S303, a set of range matched filters is constructed according to the determined waveform arrangement sequence, and range matched filtering is performed on the echo signal.

Here, referring to the example in block S302, a waveform sequence determined in block S302 is $s_2(t)$, $s_1(t)$, $s_2(t)\ldots$, then a transfer function of the corresponding frequency-domain matched filter is a conjugate function of a spectral function of the corresponding waveform, that is, $S^*_2(f)$, $S^*_1(f)$, $S^*_2(f)$, where $S_1(f)$ and $S_2(f)$ are spectra of the corresponding signals $s_1(t)$ and $s_2(t)$.

Figure 5:
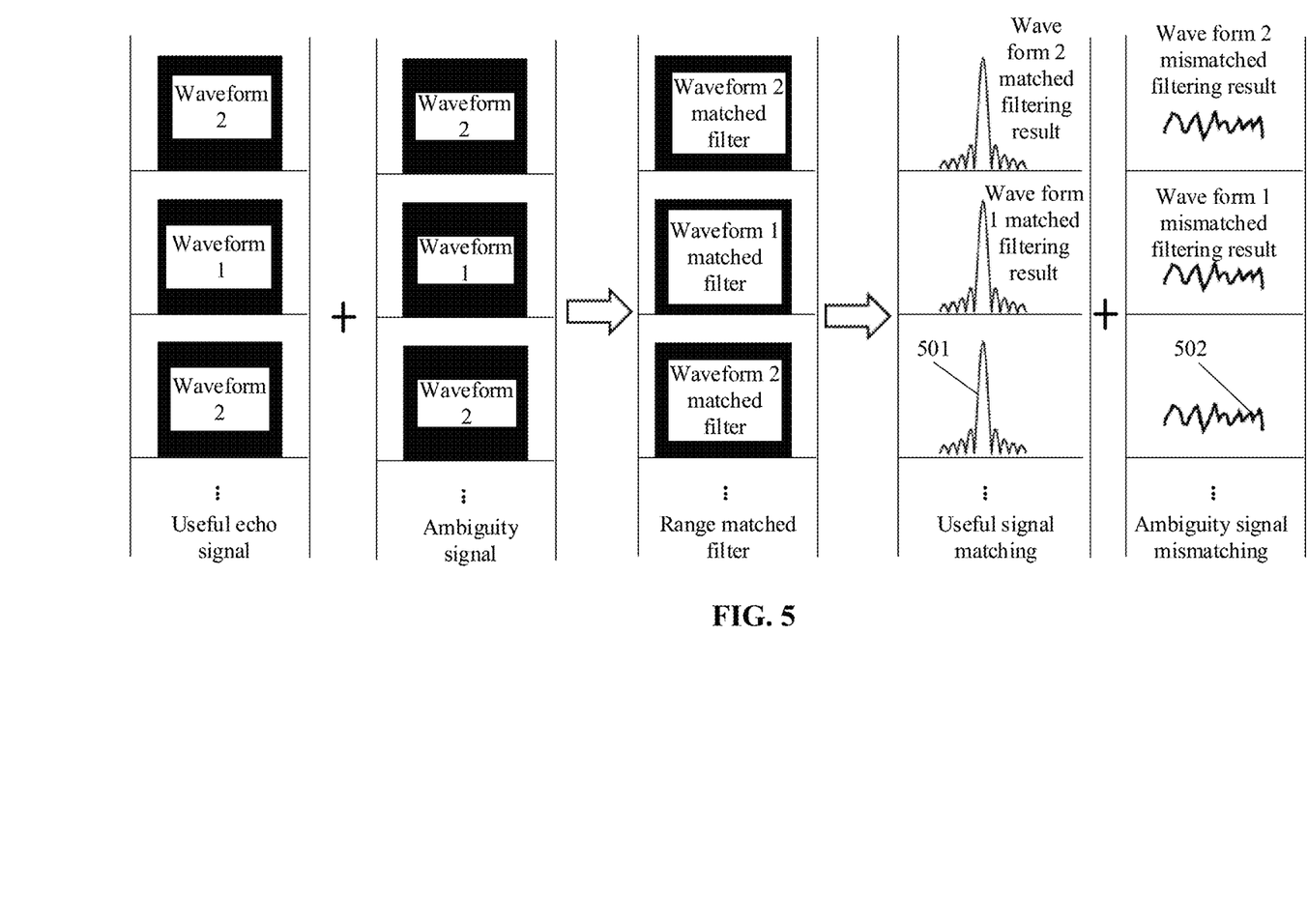
FIG. 5 is a schematic diagram of matching of constructing a set of range matched filters to suppress range ambiguity according to an embodiment of the disclosure.

As illustrated in FIG. 5, after the set of range matched filters is constructed, range compression is performed by using the set of range matched filters, so that a signal part is in a matching state and an ambiguity part is in a mismatching state. Orthogonal signals will reduce mismatching energy (cross-correlation energy), thereby ambiguity energy can be reduced.

At block S304, two-dimensional focus imaging is performed on range-compressed data.

Here, after range matched filtering is performed on the echo signal, information related to the transmitted signals has been processed, and then some two-dimensional focusing algorithms based on LFM signal may be used for imaging.

The effects of the embodiment of the disclosure are described below by simulation.

In the embodiment of the disclosure, flight simulation parameters are as shown in the following table:

TABLE 1

| Operating mode | Band |
| --- | --- |
| Radar speed | 125 m/s |
| Carrier frequency | 9.6 GHz |

TABLE 1-continued

| Operating mode | Band |
| --- | --- |
| Pulse Repetition Frequency (PRF) | 1500 Hz |
| Transmitted signal bandwidth | 400 MHz |
| Pulse width | 20 us |

Figure 6:
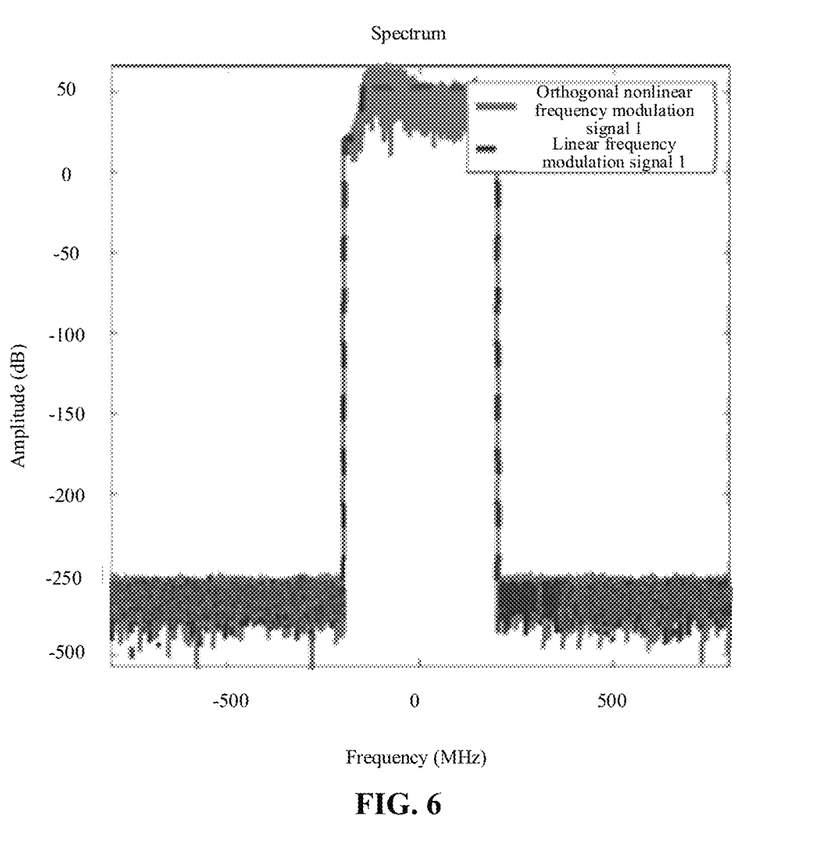
FIG. 6 is a comparison diagram of an orthogonal NLFM signal spectrum and up-down chirp signal spectra according to an embodiment of the disclosure.
Figure 7A:
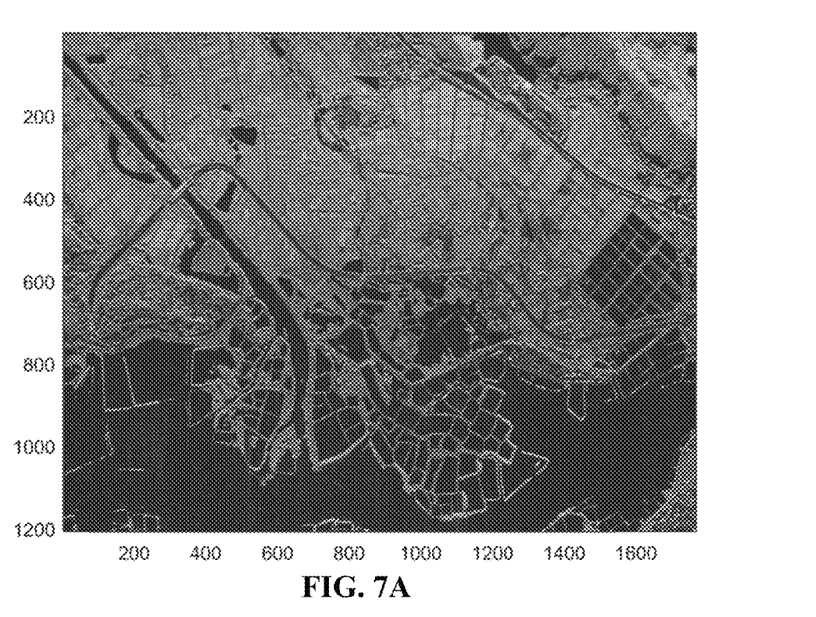
FIG. 7A is an effect diagram of ambiguity suppression of SAR imaging by alternately transmitting up-down chirp signals.
Figure 7B:
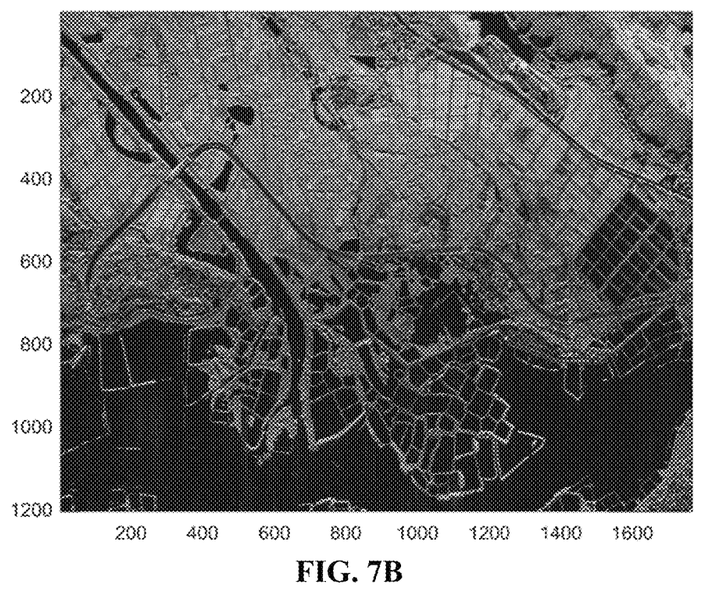
FIG. 7B is an effect diagram of ambiguity suppression of SAR imaging by alternately transmitting orthogonal NLFM signals.

In the embodiment of the disclosure, two orthogonal NLFM signals and two up-down chirp signals with the same parameter are alternately transmitted, and the signal spectra are as illustrated in FIG. 6. It can be found that all signals are in the same frequency band without losing the coherence. In SAR imaging, two images are selected firstly, a gray value is read from one of the images used as a useful echo signal, and a gray value is read from the other image used as an ambiguity signal. Simulations of surface target are performed according to the transmitted waveforms respectively, and the results are as illustrated in FIG. 7A and FIG. 7B. FIG. 7A illustrates a result of suppressing ambiguity to perform SAR imaging by using the up-down chirp signals. FIG. 7B illustrates a result of suppressing ambiguity to perform SAR imaging by using orthogonal NLFM signals. It can be found that the alternative transmission of the orthogonal NLFM signals can effectively suppress ambiguity compared with the alternative transmission of the up-down chirp signals, thereby improving the SAR imaging quality.

Fourth Embodiment

Figure 8:
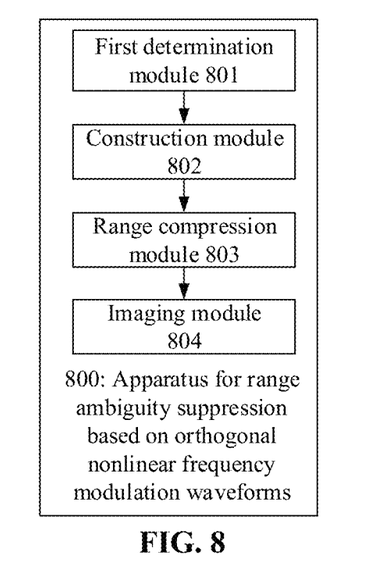
FIG. 8 is a schematic structural diagram of composition of an apparatus for range ambiguity suppression based on orthogonal NLFM waveforms according to an embodiment of the disclosure.

On the basis of the method for range ambiguity suppression based on orthogonal NLFM waveforms in the foregoing embodiment, the embodiment of the disclosure provides an apparatus for range ambiguity suppression based on orthogonal NLFM waveforms. FIG. 8 is a schematic structural diagram of composition of an apparatus for range ambiguity suppression based on orthogonal NLFM waveforms according to the embodiment of the disclosure. As illustrated in FIG. 8, the apparatus 800 includes a first determination module 801, a construction module 802, a range compression module 803 and an imaging module 804.

Specifically, the first determination module 801 is configured to determine, according to transmitted orthogonal NLFM signals, a waveform sequence of the transmitted signals corresponding to an obtained echo signal.

The construction module 802 is configured to construct a set of range matched filters according to the waveform sequence and the orthogonal NLFM signals.

The range compression module 803 is configured to perform range compression on the echo signal by using the set of range matched filters to obtain range-compressed data.

The imaging module 804 is configured to perform SAR imaging according to the range-compressed data, to obtain an imaging result, and output the imaging result.

In other embodiments, the apparatus further includes a control module.

The control module is configured to control a transmitter to periodically transmit the orthogonal NLFM signals, each period having a preset duration.

In other embodiments, the control module further includes a first acquisition unit, a first determination unit and a control unit.

The first acquisition unit is configured to acquire t orthogonal NLFM signals transmitted within the preset duration, where the preset duration is t times as much as PRI, and t is a natural number greater than 1.

The first determination unit is configured to determine identification information corresponding to the t orthogonal NLFM signals.

The control unit is configured to control, according to the t orthogonal NLFM signals and the corresponding identification information, the transmitter to periodically transmit the t orthogonal NLFM signals and identification information corresponding to the t orthogonal NLFM signals within the preset duration.

In other embodiments, the control unit is further configured to perform the following operations.

The transmitter is controlled, according to the t orthogonal NLFM signals and the corresponding identification information, to transmit an ith orthogonal NLFM signal within the preset duration, where i=1, 2, . . . , t.

The transmitter is controlled to transmit identification information corresponding to the ith orthogonal NLFM signal, such that the transmission of the identification information is performed after the transmission of the ith orthogonal NLFM signal and spaced from the transmission of the ith orthogonal NLFM signal by a preset number of protection bits.

In other embodiments, the first determination module further includes a second acquisition unit and a second determination unit.

Specifically, the second acquisition unit is configured to acquire, after obtaining an echo signal, a sequence of identification information carried in the echo signal.

The second determination unit is configured to determine a waveform sequence of transmitted signals corresponding to the obtained echo signal according to the sequence of the identification information and orthogonal NLFM signals corresponding to the identification information.

In other embodiments, the construction module further includes a third determination unit, a Fourier transform unit and a fourth determination unit.

Specifically, the third determination unit is configured to determine orthogonal NLFM signals corresponding to the waveform sequence according to the waveform sequence.

The Fourier transform unit is configured to perform Fourier transform on the orthogonal NLFM signals, to obtain a spectral function of the orthogonal NLFM signals.

The fourth determination unit is configured to determine a conjugate function of the spectral function to be a transfer function of the range matched filter.

It is to be noted that the description of the above apparatus embodiments is similar to the description of the above method embodiments, and the apparatus embodiments have beneficial effects similar to the method embodiments. For technical details not disclosed in the apparatus embodiments of the disclosure, please refer to the description of the method embodiments of the disclosure.

In practical application, the above first determination module 801, the construction module 802, the range compression module 803 and the imaging module 804 may be implemented by a central processing unit (CPU), a micro processor unit (MPU), a digital signal processor (DSP), a field programmable gate array (FPGA) or the like.

In addition, functional modules in the present embodiment may be integrated into one processing unit, or each unit may exist physically separately, or two or more units may be integrated into one unit. The above integrated unit may be implemented in the form of hardware or in the form of a software functional module.

The integrated units may be stored in a computer-readable storage medium when being implemented in the form of a software functional module and sold or used as an independent product. Based on such understanding, the technical solution of the present embodiment, which is essential or makes a contribution to the related art, or all or part of the technical solution, may be embodied in the form of a software product. The computer software product is stored in a storage medium, including several instructions to cause a computer device (which may be a personal computer, a server, a network device, etc.) or a processor to perform all or part of the steps of the methods described in the present embodiment. The foregoing storage medium includes various media capable of storing program code, such as a U disk, a portable hard disk, a read-only memory (ROM), a random access memory (RAM), a magnetic disk, or an optical disk.

Correspondingly, the embodiment of the disclosure also provides a computer-readable storage medium having stored thereon computer-executable instructions. The computer-executable instructions are executed by a processor to implement the steps of the method for range ambiguity suppression based on orthogonal NLFM waveforms according to the above embodiments.

Figure 9:
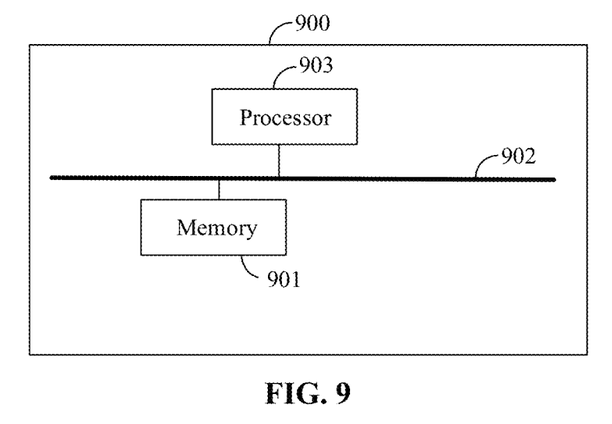
FIG. 9 is a schematic diagram of a hardware structure of a device for range ambiguity suppression based on orthogonal NLFM waveforms according to an embodiment of the disclosure.

Correspondingly, the embodiment of the disclosure provides a device for range ambiguity suppression based on orthogonal NLFM waveforms. FIG. 9 is a schematic diagram of a hardware structure of an SAR imaging device according to an embodiment of the disclosure. As illustrated in FIG. 9, the device for range ambiguity suppression 900 based on orthogonal NLFM waveforms at least includes: a memory 901, a communication bus 902 and a processor 903.

The memory 901 is configured to store a computer program and data.

The communication bus 902 is configured to connect the memory 81 and the processor 82 and perform mutual communication therebetween.

The processor 903 executes the computer program stored in the memory to implement the steps of any of the methods for range ambiguity suppression based on orthogonal NLFM waveforms in the foregoing embodiments.

In practical application, the above memory 901 may be a volatile memory such as a RAM, or a non-volatile memory such as a ROM, a flash memory, a hard disk drive (HDD) or a solid-state drive (SSD), or a combination of the above memories, and may provide instructions and data to the processor 903.

The processor 903 may be at least one of an application specific integrated circuit (ASIC), a DSP, a digital signal processing device (DSPD), a programmable logic device (PLD), an FPGA, a CPU, a controller, a microcontroller, or an MPU. It can be understood that for different devices, there may be other electronic devices for implementing a function of the above processor, which is not be specifically limited in the embodiments of the disclosure.

The numerals of the embodiments of the disclosure are only for description and do not represent merits of the embodiments.

According to the description of the above embodiments, those skilled in the art can clearly understand that above embodiment methods may be implemented by software and a necessary general hardware platform, and of course, may also be implemented by hardware. However, in many cases, the former is a preferred embodiment. Based on such understanding, a part of the technical solution of the disclosure, which is essential or makes a contribution to the related art, may be embodied in the form of a software product. The computer software product is stored in a storage medium (such as a ROM/RAM, a magnetic disk and an optical disk), including several instructions to cause a terminal (which may be a mobile phone, a computer, a server, an air conditioner, or a network device, etc.) to perform the methods described in various embodiments of the disclosure.

The embodiments of the disclosure are described above with reference to the drawings. However, the disclosure is not limited to the above specific embodiments which are merely schematic instead of being limitative. Those skilled in the art may also make many forms without departing from the spirit of the disclosure and the scope of claims under the inspiration of the disclosure. These forms all fall within the protection of the disclosure.

The invention claimed is:

1. A method for range ambiguity suppression based on orthogonal nonlinear frequency modulation (NLFM) waveforms, comprising:
   determining, by a synthetic aperture radar (SAR) imaging device, according to transmitted orthogonal NLFM signals, a waveform sequence of the transmitted signals corresponding to an obtained echo signal;
   constructing, by the SAR imaging device, a set of range matched filters according to the waveform sequence and the orthogonal NLFM signals;
   performing, by the SAR imaging device, range compression on the echo signal by using the set of range matched filters to obtain range-compressed data; and
   performing, by the SAR imaging device, SAR imaging according to the range-compressed data, to obtain an imaging result, and outputting the imaging result;
   before determining, according to the transmitted orthogonal NLFM signals, the waveform sequence corresponding to the obtained echo signal, controlling a transmitter to periodically transmit the orthogonal NLFM signals, each period having a preset duration;
   wherein controlling the transmitter to periodically transmit the orthogonal NLFM signals, each period having the preset duration comprises:
     acquiring t orthogonal NLFM signals transmitted within the preset duration, wherein the preset duration is t times as much as a pulse repetition interval (PRI), and t is a natural number greater than 1;
     determining identification information corresponding to the t orthogonal NLFM signals; and
     controlling, according to the t orthogonal NLFM signals and the corresponding identification information, the transmitter to periodically transmit the t orthogonal NLFM signals and the identification information corresponding to the t orthogonal NLFM signals within the preset duration;
   wherein controlling, according to the t orthogonal NLFM signals and the corresponding identification information, the transmitter to periodically transmit the t orthogonal NLFM signals and the identification information corresponding to the t orthogonal NLFM signals within the preset duration comprises:
     controlling, according to the t orthogonal NLFM signals and the corresponding identification information, the transmitter to transmit an ith orthogonal NLFM signal within the preset duration, where i=1, 2, . . . , t; and
     controlling the transmitter to transmit identification information corresponding to the ith orthogonal NLFM signal, such that the transmission of the identification information is performed after the transmission of the ith orthogonal NLFM signal and spaced from the transmission of the ith orthogonal NLFM signal by a preset number of protection bits.

2. The method according to claim 1, wherein determining, according to the transmitted orthogonal NLFM signals, the waveform sequence of the transmitted signals corresponding to the obtained echo signal comprises:
   after obtaining the echo signal, acquiring a sequence of the identification information carried in the echo signal; and
   determining a waveform sequence of the transmitted signals corresponding to the obtained echo signal according to the sequence of the identification information and the orthogonal NLFM signals corresponding to the identification information.

3. The method according to claim 1, wherein constructing the set of range matched filters according to the waveform sequence and the orthogonal NLFM signals comprises:
   determining orthogonal NLFM signals corresponding to the waveform sequence according to the waveform sequence;
   performing Fourier transform on the orthogonal NLFM signals to obtain a spectral function of the orthogonal NLFM signals; and
   determining a conjugate function of the spectral function to be a transfer function of the range matched filter.

4. The method according to claim 1, wherein a different orthogonal NLFM signal is transmitted in each pulse repetition interval (PRI) of the preset duration.

5. An apparatus for range ambiguity suppression based on orthogonal nonlinear frequency modulation waveforms, comprising:
   a processor; and
   a memory storing instructions, which, when executed by the processor, cause the processor to execute operations comprising:
   determining, according to transmitted orthogonal NLFM signals, a waveform sequence of the transmitted signals corresponding to an obtained echo signal;
   constructing a set of range matched filters according to the waveform sequence and the orthogonal nonlinear frequency modulation (NLFM) signals;
   performing range compression on the echo signal by using the set of range matched filters to obtain range-compressed data; and
   performing synthetic aperture radar (SAR) imaging according to the range-compressed data, to obtain an imaging result, and outputting the imaging result;
   wherein the processor is further configured to execute an operation comprising:
   before determining, according to the transmitted orthogonal NLFM signals, the waveform sequence corresponding to the obtained echo signal, controlling a transmitter to periodically transmit orthogonal NLFM signals, each period having a preset duration;
   wherein the processor is further configured to execute operations comprising:
     acquiring t orthogonal NLFM signals transmitted within the preset duration, wherein the preset duration is t times as much as a pulse repetition interval (PRI), and t is a natural number greater than 1;
     determining identification information corresponding to the t orthogonal NLFM signals; and
     controlling, according to the t orthogonal NLFM signals and the corresponding identification information, the transmitter to periodically transmit the t orthogonal NLFM signals and the identification information corresponding to the t orthogonal NLFM signals within the preset duration;

wherein the processor is further configured to execute operations comprising:

controlling, according to the t orthogonal NLFM signals and the corresponding identification information, the transmitter to transmit an ith orthogonal NLFM signal within the preset duration, where i=1, 2, . . . , t; and controlling the transmitter to transmit identification information corresponding to the ith orthogonal NLFM signal, such that the transmission of the identification information is performed after the transmission of the ith orthogonal NLFM signal and spaced from the transmission of the ith orthogonal NLFM signal by a preset number of protection bits.

6. The apparatus according to claim 5, wherein the processor is further configured to execute operations comprising:

after obtaining the echo signal, acquiring a sequence of the identification information carried in the echo signal; and determining a waveform sequence of the transmitted signals corresponding to the obtained echo signal according to the sequence of the identification information and the orthogonal NLFM signals corresponding to the identification information.

7. The apparatus according to claim 5, wherein the processor is further configured to execute operations comprising:

determining orthogonal NLFM signals corresponding to the waveform sequence according to the waveform sequence;

performing Fourier transform on the orthogonal NLFM signals to obtain a spectral function of the orthogonal NLFM signals; and determining a conjugate function of the spectral function to be a transfer function of the range matched filter.

8. The apparatus according to claim 5, wherein a different orthogonal NLFM signal is transmitted in each pulse repetition interval (PRI) of the preset duration.

9. A non-transitory computer-readable storage medium having stored thereon computer-executable instructions, which when being executed by a processor, to execute operations comprising:

determining, according to transmitted orthogonal NLFM (NLFM) signals, a waveform sequence of the transmitted signals corresponding to an obtained echo signal;

constructing a set of range matched filters according to the waveform sequence and the orthogonal NLFM signals;

performing range compression on the echo signal by using the set of range matched filters to obtain range-compressed data; and performing synthetic aperture radar (SAR) imaging according to the range-compressed data, to obtain an imaging result, and outputting the imaging result;

wherein the processor is further configured to execute an operation comprising:

before determining, according to the transmitted orthogonal NLFM signals, the waveform sequence corresponding to the obtained echo signal, controlling a transmitter to periodically transmit orthogonal NLFM signals, each period having a preset duration;

wherein the processor is further configured to execute operations comprising:

acquiring t orthogonal NLFM signals transmitted within the preset duration, wherein the preset duration is t times as much as a pulse repetition interval (PRI), and t is a natural number greater than 1;

determining identification information corresponding to the t orthogonal NLFM signals; and controlling, according to the t orthogonal NLFM signals and the corresponding identification information, the transmitter to periodically transmit the t orthogonal NLFM signals and the identification information corresponding to the t orthogonal NLFM signals within the preset duration;

wherein the processor is further configured to execute operations comprising:

controlling, according to the t orthogonal NLFM signals and the corresponding identification information, the transmitter to transmit an ith orthogonal NLFM signal within the preset duration, where i=1, 2, . . . , t; and controlling the transmitter to transmit identification information corresponding to the ith orthogonal NLFM signal, such that the transmission of the identification information is performed after the transmission of the ith orthogonal NLFM signal and spaced from the transmission of the ith orthogonal NLFM signal by a preset number of protection bits.

10. The non-transitory computer-readable storage medium according to claim 9, wherein the processor is further configured to execute operations comprising:

after obtaining the echo signal, acquiring a sequence of the identification information carried in the echo signal; and determining a waveform sequence of the transmitted signals corresponding to the obtained echo signal according to the sequence of the identification information and the orthogonal NLFM signals corresponding to the identification information.

11. The non-transitory computer-readable storage medium according to claim 9, wherein the processor is further configured to execute operations comprising:

determining orthogonal NLFM signals corresponding to the waveform sequence according to the waveform sequence;

performing Fourier transform on the orthogonal NLFM signals to obtain a spectral function of the orthogonal NLFM signals; and determining a conjugate function of the spectral function to be a transfer function of the range matched filter.

* * * * *

UNITED STATES PATENT AND TRADEMARK OFFICE
CERTIFICATE OF CORRECTION

PATENT NO. : 11,187,797 B2
APPLICATION NO. : 16/284732
DATED : November 30, 2021
INVENTOR(S) : Yu Wang et al.

It is certified that error appears in the above-identified patent and that said Letters Patent is hereby corrected as shown below:

On the Title Page

Item (73) The Assignee should be listed as:
INSTITUTE OF ELECTRONICS, CHINESE ACADEMY OF SCIENCES
BEIJING (CN)

Signed and Sealed this
Twentieth Day of June, 2023

Katherine Kelly Vidal
*Director of the United States Patent and Trademark Office*